3,249,393
PROCESS OF DYEING POLYMERIC FILM

Howard C. Haas, Arlington, and Norman W. Schuler, Lexington, Mass., assignors to Polaroid Corporation, Cambridge, Mass., a corporation of Delaware
No Drawing. Filed Jan. 8, 1962, Ser. No. 164,988
10 Claims. (Cl. 8—4)

This invention relates to dyeing and, more particularly, to dyeable polymeric materials.

One object of this invention is to provide novel dyeable polymeric materials.

Another object is to provide novel dyeable polymeric materials that are substantially insensitive to water and fast to dyes.

Another object of this invention is to provide novel dyeable polymeric materials comprising 4-vinylpyridine/N-vinyl-2-pyrrolidone copolymers.

Another object of this invention is to provide novel dyeable polymeric materials comprising mixtures of poly-4-vinylpyridine and poly-N-vinyl-2-pyrrolidone.

Still another object of this invention is to provide novel dyeable polymeric materials comprising poly-4-vinylpyridine and poly-N-vinyl-2-pyrrolidone, which are water-swellable, water-insoluble mordants.

Still another object of this invention is to provide a novel composition of matter comprising mixtures of poly-4-vinylpyridine and poly-N-vinyl-2-pyrrolidone.

Other objects of the invention will in part be obvious and will in part appear hereinafter.

The invention accordingly comprises the several steps and the relation and order of one or more of such steps with respect to each of the others, and the products possessing the features, properties and relation of elements which are exemplified in the following detailed disclosure, and the scope of the application of which will be indicated in the claims.

In selecting polymeric materials for an aqueous dyeing process, it is desirable that the material be one that is substantially insoluble to the aqueous dye bath, particularly a aqueous alkaline dye bath, but will swell sufficiently to allow the dye to penetrate the polymer readily to the mordant sites.

It is known that films of poly-4-vinylpyridine do not swell appreciably in dye baths and therefore the rate of dyeing is so slow that the material is unsuited for many dyeing processes that require a short length of time. Thus the rate of diffusion of dye into the polymeric sheet is so low that the polymer can be considered essentially undyeable for many dyeing processes.

It is also known that, due to the high degree of water-solubility of films of poly-N-vinyl-2-pyrrolidone, this polymer is unsuitable as a dyeable polymeric material since the polymeric film goes into solution or disintegrates in aqueous dye baths.

It has now been discovered that physical mixtures of poly-4-vinylpyridine and polyvinylpyrrolidone and 4-vinylpyridine/N-vinyl-2-pyrrolidone copolymers, unlike the separate polymers, form dyeable polymeric materials that are substantially water-insoluble, swell to a sufficient degree in the aqueous dye solution, preferably an aqueous alkaline dye bath, to permit rapid and substantial dye penetration to the mordant sites of the material. Thus, the combinations of these materials, both as physical mixtures and copolymers, possess the outstanding characteristics not present in the individual components of exceptionally high quality dyeable materials.

In carrying out this invention, films cast from a 4-vinylpyridne/N-vinyl-2-pyrrolidone copolymer were dyed with an aqueous dye solution. The dye was not extracted from the film by physical contact, as by rubbing with a cloth, or by washing with water. No evidence of water-solubility of the film was apparent.

Films were cast from a solution containing 10% each of poly-4-vinylpyridine and polyvinylpyrrolidone to form physical mixtures of the two polymers. When tested as dyeable strata they were found to dye well, be insoluble to the aqueous dye solution and to possess superior qualities as mordants.

The following nonlimiting examples illustrate the preparation of dyeable polymeric strata within the scope of this invention.

Example I

A 4-vinylpyridine/N-vinyl-2-pyrrolidone copolymer was prepared from a 3 to 7 molar ratio of monomers in the following manner: 10.5 g. of 4-vinylpyridine, 25.9 g. of N-vinyl-2-pyrrolidone, 30 ml. of methanol and 0.3% of azobisisobutyronitrile were sealed in a tube under vacuum and heated for 3 hours at 65° C. The initial polymer was precipitated into ether, washed and dried. 6 g. of the copolymer were produced.

Example II

A 4-vinylpyridine/N-vinyl-2-pyrrolidone copolymer was prepared from an equimolar ratio of monomers according to the procedure in Example I using 15.7 g. of 4-vinylpyridine and 16.7 g. of N-vinyl-2-pyrrolidone. 6 g. of the copolymer were produced.

Example III

A 4-vinylpyridine/N-vinyl-2-pyrrolidone copolymer was prepared from a 7 to 3 molar ratio of monomers according to the procedure of Example I using 24.5 g. of 4-vinylpyridine and 11.1 g. of N-vinyl-2-pyrrolidone. 3.5 g. of the copolymer were produced.

Polymeric films comprising mixtures of poly-4-vinylpyridine and poly-N-vinyl-2-pyrrolidone were prepared from 10% solutions of the respective polymers. The solutions were prepared as follows:

A 10% solution of poly-4-vinylpyridine was prepared by mixing 10 grams of poly-4-vinylpyridine, 10 grams of acetic acid and 80 cc. of water.

A 10% aqueous solution of poly-N-vinyl-2-pyrrolidone was prepared using 10 g. of poly-N-vinyl-2-pyrrolidone and 90 cc. of water.

Example IV

Using the 10% polymer solutions prepared as above, a mixture of 2 to 1 poly-N-vinyl-2-pyrrolidone and poly-4-vinylpyridine was cast into a film and dried.

Example V

Using the 10% polymer solutions prepared as above, a mixture of 3 to 1 poly-N-vinyl-2-pyrrolidone and poly-4-vinylpyridine was cast into a film and dried.

Example VI

Using the 10% polymer solutions prepared as above, a mixture of 2 to 1 poly-4-vinylpyridine and poly-N-vinyl-2-pyrrolidone was cast into a film and dried.

Example VII

Using the 10% polymer solutions prepared as above, a mixture of 3 to 1 poly-4-vinylpyridine and poly-N-vinyl-2-pyrrolidone was cast into a film and dried.

In order to determine quantitatively the effectiveness of the dyeable polymeric strata, the following test procedure was devised and applied to the materials.

Example VIII 0.1 g. of dried, ground polymer and 5 ml. of 0.0025 M 1,4-bis-($\alpha$-methyl-$\beta$-hydroquinonylethylamino)-5,8-dihydroxyanthraquinone dye in 2% alkali were sealed, under nitrogen, in a 7 cc. screw-cap vial. Glass beads were also placed in the vial for agitation. The vial was tumbled at room temperature for six days. At the end of that time a 1 ml. aliquot was removed from the vial and diluted to 50 ml. with acetone containing 2 cc. of acetic acid. The dye was then examined spectrally and the optical transmission density measured on a Cary Spectrophotometer at the $\lambda_{max}$. of the dye, 676 m$\mu$.

The results, appearing in tabular form below, indicate, by transmission density measurement of the dye solution after exposure to the polymer, the degree of dyeing of the polymeric films and illustrate the improvement of the copolymers and mixtures of the polymers over the polymers per se. The blank used as a standard was the dye alone treated in the same manner as the test mixtures.

| Material: | Density |
|---|---|
| Blank— | |
| Before agitation | 1.38 |
| After 6 days' agitation | 1.35 |
| Poly-4-vinylpyridine | 1.35 |
| Poly-N-vinyl-2-pyrrolidone (Polymer dissolved) | No reading |
| 4-vinylpyridine/N-vinyl-2-pyrrolidone copolymer (prepared from a 3 to 7 molar ratio of monomers) | 0.88 |
| 4-vinylpyridine/N-vinyl-2-pyrrolidone copolymer (prepared from an equimolar monomer ratio) | 0.76 |
| 4-vinylpyridine/N-vinylpyrrolidone copolymer (prepared from a 7 to 3 molar ratio of monomers) | 0.47 |
| 2 to 1 poly-N-vinyl-2-pyrrolidone-poly-4-vinylpyridine mixture | 0.59 |
| 3 to 1 poly-N-vinyl-2-pyrrolidone-poly-4-vinylpyridine mixture | 0.64 |
| 2 to 1 poly-4-vinylpyridine-poly-N-vinyl-2-pyrrolidone mixture | 0.71 |
| 3 to 1 poly-4-vinylpyridine-poly-N-vinyl-2-pyrrolidone mixture | 0.60 |

The dyeable polymeric materials of this invention may be used wherever a dyeable water-insoluble mordant is desired. Such dyeable materials are also useful as image-receiving materials in color photography, e.g., in the color process disclosed in the U.S. Patent No. 2,983,606, issued May 9, 1961, to Howard G. Rogers.

In a preferred embodiment of the dyeable polymeric sheets, both copolymers and mixtures, should contain at least 50% 4-vinylpyridine units in order to achieve the most favorable degree of water-insensitivity. As high as 90% 4-vinylpyridine units may be present in the sheets, the preferred level being 70–75%.

In preparing the dyeable polymeric sheets of this invention, it is desirable to use high molecular weight polyvinylpyrrolidone.

The term "dye," as used herein, is intended to include dyes which contain silver halide developing functions, e.g., a p-dihydroxyphenyl group, as well as dyes that do not. Examples of such dyes that contain silver halide developing functions, frequently referred to as dye developers, are given in the above-mentioned U.S. Patent No. 2,983,606. Preferred dyes in the novel process of this invention are azo and anthraquinone dyes.

It should also be understood that the term "aqueous dye solution" or "aqueous dye bath" etc., as used herein, is intended to include aqueous alkaline dye baths.

It is apparent that the dyeable polymeric materials of this invention may be supported or unsupported. The film may be cast on a surface, e.g., glass, peeled off, and then used per se or the films may be bonded to a support layer, e.g., glass, baryta paper or plastics such as subcoated cellulose acetate butyrate and subcoated cellulose acetate.

The novel dyeable materials of this invention may be cross-linked by suitable cross-linking agents, e.g., polyhalo compounds such as p-xylylene dibromide and hexamethylene dibromide.

Since certain changes may be made in the above products and processes without departing from the scope of the invention herein involved, it is intended that all matter contained in the above description shall be interpreted as illustrative and not in a limiting sense.

What is claimed is:

1. The process of dyeing a polymer which comprises applying an aqueous alkaline solution of a dye to a dyeable polymeric film, said polymeric film comprising a polymer selected from the class consisting of (a) 4-vinylpyridine/N-vinyl-2-pyrrolidone copolymers, and (b) mixtures of poly-4-vinylpyridine and poly-N-vinyl-2-pyrrolidone, said polymer containing at least 50% 4-vinylpyridine units.

2. The process as defined in claim 1 wherein said dye is a dye developer which is both a dye and a silver halide developing agent.

3. The process as defined in claim 2 wherein said dye developer is 1,4-bis-($\alpha$-methyl-$\beta$-hydroquinonylethylamino)-5,8-dihydroxyanthraquinone.

4. A dyeable polymeric film selected from the group consisting of (a) 4-vinylpyridine/N-vinyl-2-pyrrolidone copolymers and (b) mixtures of poly-4-vinylpyridine and poly-N-vinyl-2-pyrrolidone, said polymeric film containing at least 50% 4-vinylpyridine units.

5. A product as defined in claim 4 wherein said dyeable polymeric film is a 3 to 1 mixture of poly-4-vinylpyridine and poly-N-vinyl-2-pyrrolidone.

6. A product as defined in claim 4 wherein said dyeable polymeric film is a 4-vinylpyridine/N-vinyl-2-pyrrolidone copolymer prepared from an equimolar ratio of monomers.

7. The process of dyeing a polymer which comprises applying an aqueous alkaline solution of a dye to a dyeable polymeric film of 4-vinylpyridine/N-vinyl-2-pyrrolidone copolymer containing at least 50% 4-vinylpyridine units.

8. The process of dyeing a polymer which comprises applying an aqueous alkaline solution of a dye to a dyeable polymeric film comprising a mixture of poly-4-vinylpyridine and poly-N-vinyl-2-pyrrolidone, said polymer containing at least 50% 4-vinylpyridine units.

9. A dyeable polymeric film comprising a 4-vinylpyridine/N-vinyl-2-pyrrolidone copolymer, said copolymer containing at least 50% 4-vinylpyridine units.

10. A dyeable polymeric film comprising a mixture of poly-4-vinylpyridine and poly-N-vinyl-2-pyrrolidone, said poly-4-vinylpyridine comprising at least 50% of the mixture.

References Cited by the Examiner

UNITED STATES PATENTS 2,643,990   6/1953   Ham _____ 260—45.5
2,853,417   9/1958   Werner et al. _____ 260—88.3

NORMAN G. TORCHIN, *Primary Examiner.*

MORRIS LIEBMAN, *Examiner.*